UNITED STATES PATENT OFFICE.

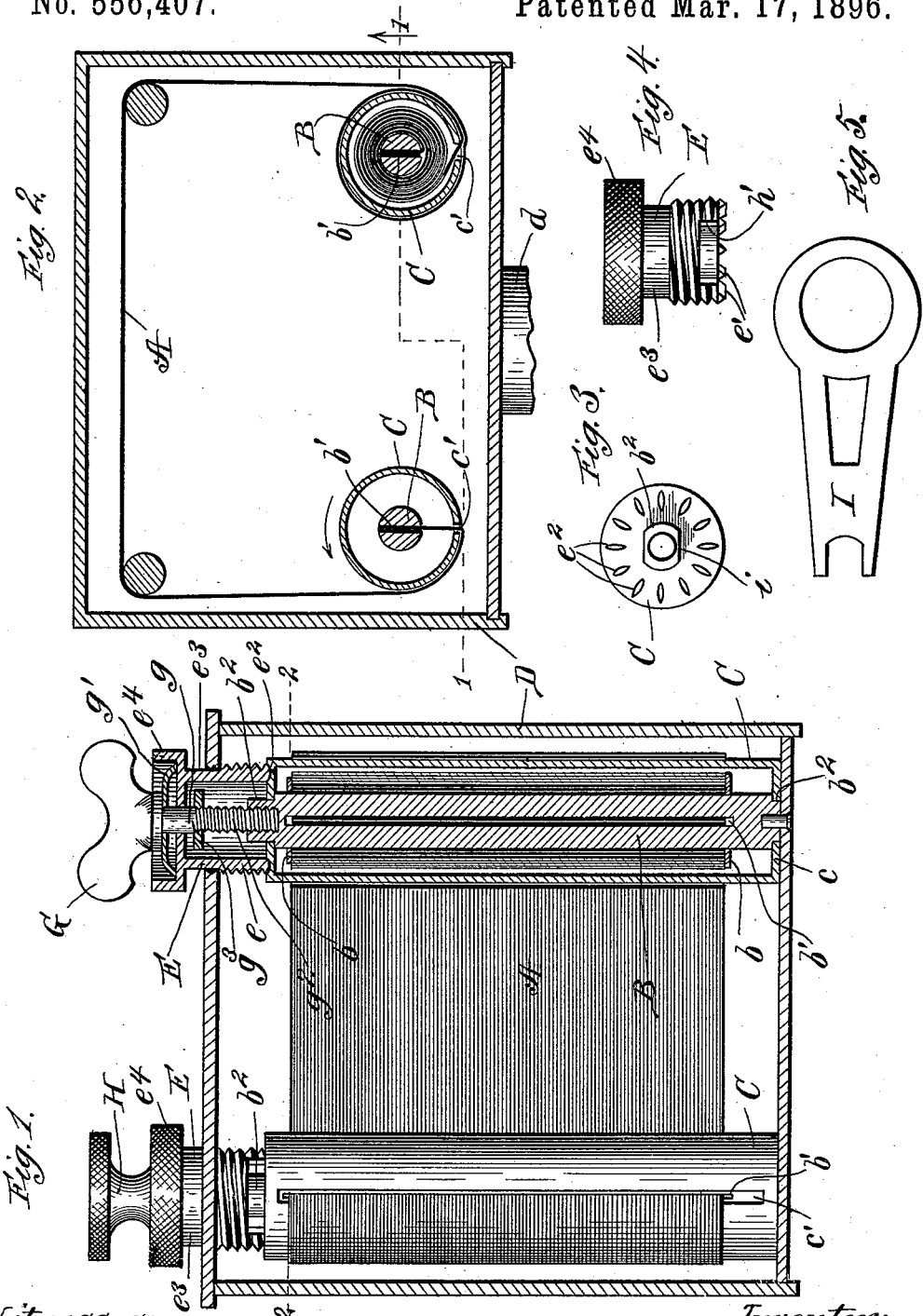

WILLIAM V. ESMOND, OF CHICAGO, ILLINOIS, ASSIGNOR, BY MESNE ASSIGN-MENTS, OF ONE-HALF TO THE AUTOMATIC CAMERA COMPANY, OF NEW YORK.

FILM-LOADER FOR ROLL-HOLDERS.

SPECIFICATION forming part of Letters Patent No. 556,407, dated March 17, 1896.

Application filed January 16, 1895. Renewed September 9, 1895. Serial No. 562,061. (No model.)

*To all whom it may concern:*

Be it known that I, WILLIAM V. ESMOND, a citizen of the United States, residing at Chicago, Cook county, Illinois, have invented certain new and useful Improvements in Film-Loaders for Photographic Cameras, of which the following is a specification.

The object of my invention is to provide a simple, economical, and efficient film-loader so constructed and arranged that a photographic camera or roll-holder may be loaded in ordinary daylight without any danger of fogging the film; and the invention consists in the features and combinations hereinafter described and claimed.

In the accompanying drawings, Figure 1 is a vertical sectional elevation taken on line 1 of Fig. 2; Fig. 2, a longitudinal sectional plan view taken on line 2 of Fig. 1, looking in the direction of the arrow; Fig. 3, an end view of the film-casing; Fig. 4, a side elevation of the casing-journal, and Fig. 5 a plan view of a key hereinafter described for holding the inner roller against rotation.

It is well known in the art of photography that the loading of a camera or roll-holder in ordinary daylight is attended with danger of fogging the film, thereby producing imperfect or worthless negatives. To avoid this disadvantage various film-loaders have been designed with the idea of facilitating the loading of cameras and roll-holders in daylight.

The principal object of my invention, therefore, is to provide a simple, economical, and efficient film-loader which obviates these disadvantages and renders the loading of a film into a camera or roll-holder in daylight practical.

To hold the film A, when in storage or shipment, from being fogged by the light, I provide a spool B, around which the film is wound. This spool is provided with shoulders $b$, which in ordinary cases prevent the light from entering between the layers of film and fogging the ends. The spool is slotted at $b'$ to receive one end of the film to assist in winding the same. To protect the film around the spool from being acted on by the rays of light, I provide an outer cylindrical film-casing C, having closed ends $c$, which also form bearings for the end portions $b^2$ of the spool. This outer casing is provided with a slot $c'$, through which the film may be inserted, and when brought into alignment with the slot of the spool the film may be passed through both to wind it upon the spool.

The film is inserted through the slot of the film-casing and wound upon the spool until the desired amount has been rolled thereon. The end of the film may or may not be provided, as desired, with an opaque portion, which is allowed to project, so that it may be wound around the case and assist in preventing any light from entering the case to fog the film. The opaque end may be dispensed with and a sensitized or unsensitized end of the film be wound around the case, and so much of it as is wound on the outside may be cut off after the desired photographs have been taken. It will thus be seen that in storage and shipment the film-case prevents the actinic rays of light from entering the same, while the spool-shoulders are an additional means of preventing the light from affecting the ends of the film. The winding of the end portion of the film around the film-case further protects the entire loader.

To load a camera or roll-holder D during daylight, I provide the camera or roll-holder with a cylindrical journal E, that has a threaded portion $e$, normally engaged with a threaded opening in the case or holder, and its lower end with teeth $e'$, adapted to engage with recesses or indentations $e^2$ in the end of the film-case of the loader. Normally the threaded portion of the cylindrical journal is engaged, as above stated, with the threaded opening in the roll-holder or camera, and when the loader is placed in position the journal is screwed down until its teeth portions engage with the recesses of the film-case. Its smooth cylindrical portion $e^3$ forms the bearing for the journal, so that by taking hold of the head $e^4$ the journal and case may be rotated. This is necessary from the fact that as the opaque portion of the film is unwound the case C must at the same time be permitted to rotate.

To permit an independent rotation of the film-spool, I provide the cylindrical journal with a thumb-screw G, that has its bearing portion $g$ in the cylindrical journal, while inserted between the shoulder of the thumb-screw and a proper recess in the cylindrical journal is a dish-shaped tension-spring $g'$ to obtain the desired tension between such parts. The inner threaded portion $g^2$ of the thumb-screw engages with a threaded opening in the end of the spool, so that by turning the thumb-screw in the proper direction it will engage such threaded opening, obtain the desired engagement and permit either an independent or simultaneous rotation of the parts. The thumb-screw is provided with a check-nut $g^3$, which limits the vertical or longitudinal movement, so that the thumb-nut remains fastened to the journal.

To prevent the spool from rotating while it is being engaged by its operating thumb-screw, or vice versa, I slot or groove the lower end of the cylindrical journal at $h'$, so that a wrench or key I may be inserted therethrough to engage with the flattened end $i$ of the spool and prevent its rotation. By this arrangement it will be seen that any desired tension between the end of the thumb-screw and the cylindrical journal may be obtained, or the entire disengagement of the spool and its actuating-screw may be obtained. By turning down the actuating-screw any desired tension may be obtained between the spool and its case, and by obtaining the maximum tension between the thumb-screw and the cylindrical journal it renders it practically impossible to rotate the film-case.

In operation one unloaded film-holder is inserted in the case. The loaded film-holder is placed in position and the cylindrical journal brought down into engagement with the film-case, as above described. A portion of the opaque end of the film is passed through the opening in the empty loader and engaged with the slotted opening of the interior spool. (In the drawings the roll to the left is the unloaded spool.) By turning the thumb-screw H to the left, as indicated by the arrow in Fig. 2, the interior roll only will revolve, the film-case remaining practically stationary, as the tension between the film and the roll prevents it from rotating owing to the assistance of the tension-springs. The rest of the opaque or projecting end of the film which is wound around the right film-case will unwind and rotate its case until all of the film rolled thereon is free, and the interior film will come out of the case and unwind or rotate its spool. The unwinding of the spool, therefore, with the assistance of the tension-spring, which is inserted between the thumb-screw and cylindrical journal, prevents rotation of the film-case and permits an independent rotation of the spool.

The principal advantages of my improvement are that I have provided a simple, economical, and efficient film-loader by which a camera or roll-holder may be loaded during daylight, and by rendering the different parts independent or simultaneously rotatable the film which is wound around the film-case may be easily removed, and when removed the case remains stationary, while the film-spool rotates.

While I have described my invention with more or less minuteness as regards details, I do not desire to be limited thereto unduly any more than is pointed out in the claims. On the contrary, I contemplate all proper changes in form, construction, and arrangement, and the omission of parts and substitution of equivalents as circumstances may suggest or render expedient.

I claim—

1. In a film-loader, the combination of an interior rotatable spool around which film may be wound, and an outer rotatable case provided with a longitudinal slot for the insertion of film, and closed ends in which the spool may rotate, substantially as described.

2. In combination with a camera or roll-holder, a film-loader comprising an inner rotatable spool around which film may be wound, an outer rotatable case for the spool provided with a longitudinal slot through which the film may be inserted to engage the spool, and means for securing the film-loader in the camera or roll-holder to secure an independent and simultaneous rotation of the parts, substantially as described.

3. In combination with a camera or roll-holder, a film-loader comprising an inner slotted rotatable spool around which film may be wound, an outer rotatable case for the spool provided with a longitudinal slot through which the film may be inserted to engage the spool and closed ends, a journal for the film-case in the camera or roll-holder, an actuating-stud for the film-spool, and means for obtaining tension between the spool and case to permit an independent and simultaneous rotation of spool and case, substantially as described.

4. In combination with a camera or roll-holder, a film-loader comprising an inner slotted rotatable spool around which film may be wound, an outer rotatable film-case for the spool provided with a longitudinal slot through which film may be inserted to engage the spool, and closed ends to form a portion of the bearings for the spool, a cylindrical journal secured in the camera or roll-holder adapted to engage with the film-case and form its bearing portion, an actuating thumb-screw engaging with the film-spool to rotate the same, and a tension-spring inserted between the actuating-screw and cylindrical journal to permit an independent and simultaneous rotation of the parts, substantially as described.

5. In combination with a camera or roll-holder, a film-loader comprising an inner rotatable spool around which film may be wound and provided with a flattened or irregular end to be engaged by a key to prevent rotation, an outer rotatable film-case for the spool provided with a longitudinal slot through which the film may be inserted to engage the spool, closed ends to form at least a portion of the bearings for the spool, a cylindrical journal in the camera or roll-holder to form the bearing portion for the film-case provided with a notch or groove through which a key or wrench may be inserted to engage the flattened or irregular end of the spool, an actuating-screw adapted to engage with the threaded portion of the spool and rotate the same, and a tension-spring inserted between the actuating-screw and film-case journal to permit a simultaneous and independent rotation of the parts, substantially as described.

6. In combination with a camera or roll-holder, a film-loader comprising an inner rotatable spool around which film may be wound, an outer rotatable film-case for the spool provided with a longitudinal slot through which film may be inserted to engage the spool, a cylindrical journal for the film-case having a threaded portion adapted to engage with the threaded opening in the camera or roll-holder and obtain vertical motion, a smooth cylindrical portion to form the rotatable bearing for the film-case, one of such parts—the cylindrical journal and the film-case—being provided with projections and the other with recesses to form a clutch engagement between the parts, an actuating-screw having its bearing portion in the cylindrical journal adapted to engage with the spool to rotate the same, and a dish-shaped tension-spring interposed between the actuating-screw and the cylindrical journal to permit an independent and simultaneous rotation of the parts, substantially as described.

WILLIAM V. ESMOND.

Witnesses:
 BENJ. J. SAMUELS,
 O. E. FORCHE.